United States Patent [19]

Morita et al.

[11] 4,245,705

[45] Jan. 20, 1981

[54] APPARATUS FOR TAKING OFF VIBRATORY POWER FOR TRACTOR

[75] Inventors: Shigeru Morita; Fumiharu Horie, both of Sakai, Japan

[73] Assignee: Kubota, Ltd., Osaka, Japan

[21] Appl. No.: 77,727

[22] Filed: Sep. 21, 1979

[30] Foreign Application Priority Data

Apr. 7, 1979 [JP] Japan .............................. 54-46125[U]
Apr. 7, 1979 [JP] Japan .............................. 54-46127[U]

[51] Int. Cl.³ ........................................... A01B 11/00
[52] U.S. Cl. ..................................... 172/125; 74/42; 37/193; 172/40
[58] Field of Search ......................... 172/40, 118, 125; 74/42; 37/193; 180/53 D

[56] References Cited

FOREIGN PATENT DOCUMENTS

| | | |
|---|---|---|
| 49-10721 | 3/1974 | Japan . |
| 51-3628 | 2/1976 | Japan . |
| 51-3629 | 2/1976 | Japan . |
| 53-80704 | 7/1978 | Japan . |
| 53-113105 | 10/1978 | Japan . |
| 53-126126 | 12/1978 | Japan . |

*Primary Examiner*—Paul E. Shapiro
*Attorney, Agent, or Firm*—Armstrong, Nikaido, Marmelstein & Kubovcik

[57] ABSTRACT

A vibratory power take-off apparatus for a tractor including a vibration producing unit detachably mountable on the frame of the tractor. The unit comprises a rotary transmitting shaft detachably fittable to a PTO shaft on the tractor frame and having a connecting portion eccentric with the axis of the PTO shaft, a holding case supporting the rotary transmitting shaft rotatably relative thereto, a mounting cylinder fitting around the case and having supporting portions connectable to the tractor frame, intermediate vibration transmitting means supported by the cylinder pivotally movably up and down, means for operatively coupling the connecting portion of the shaft to the transmitting means, and intermediate vibration delivering means having one end pivoted to the transmitting means and the other end pivotally connectable to a working implement connected to the tractor frame.

4 Claims, 9 Drawing Figures

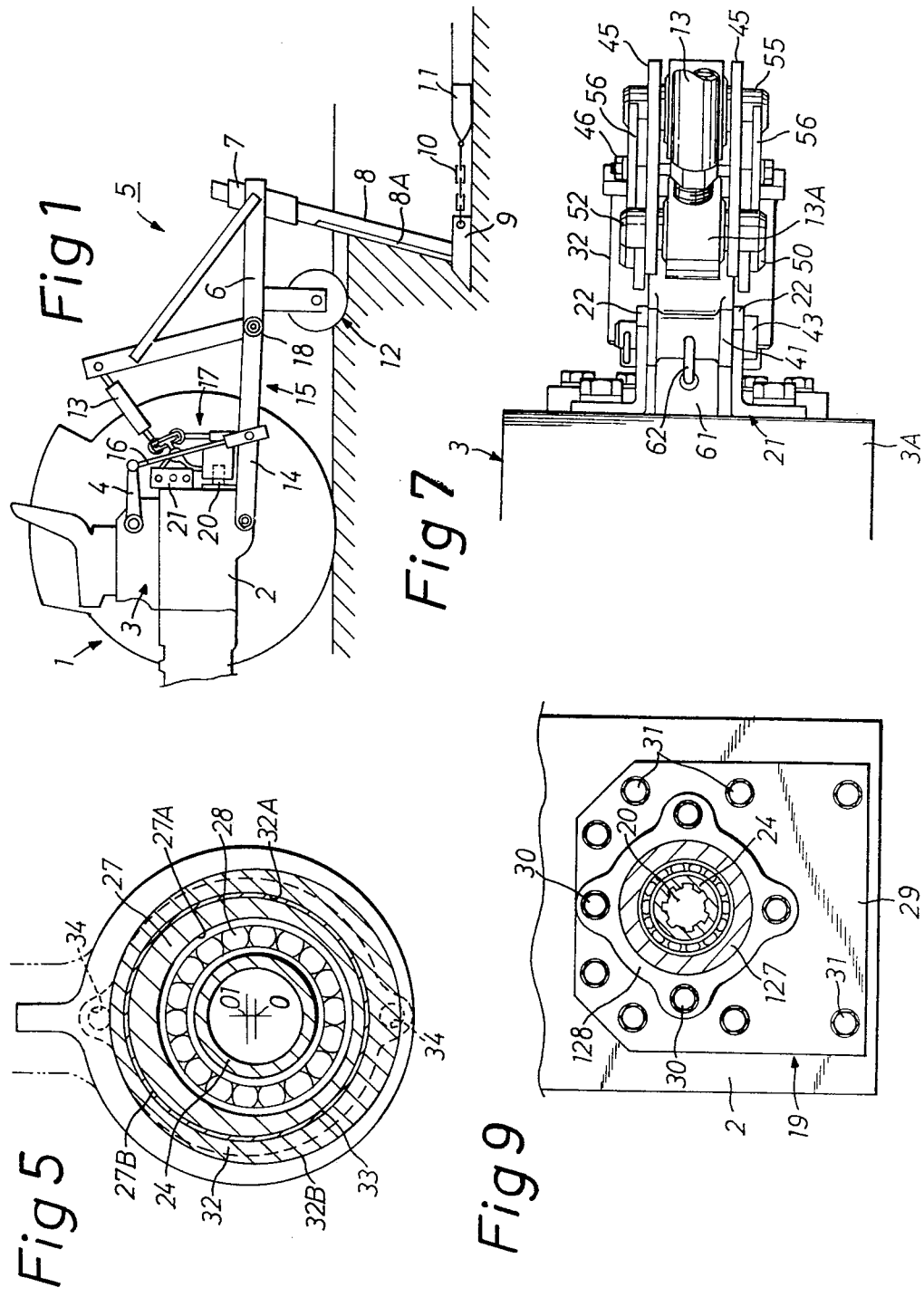

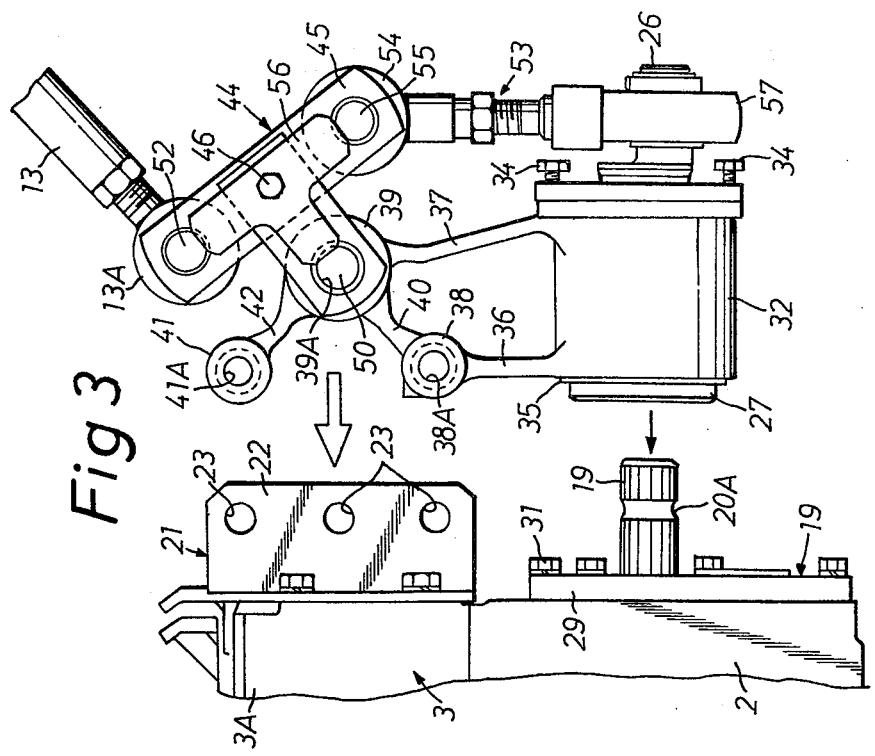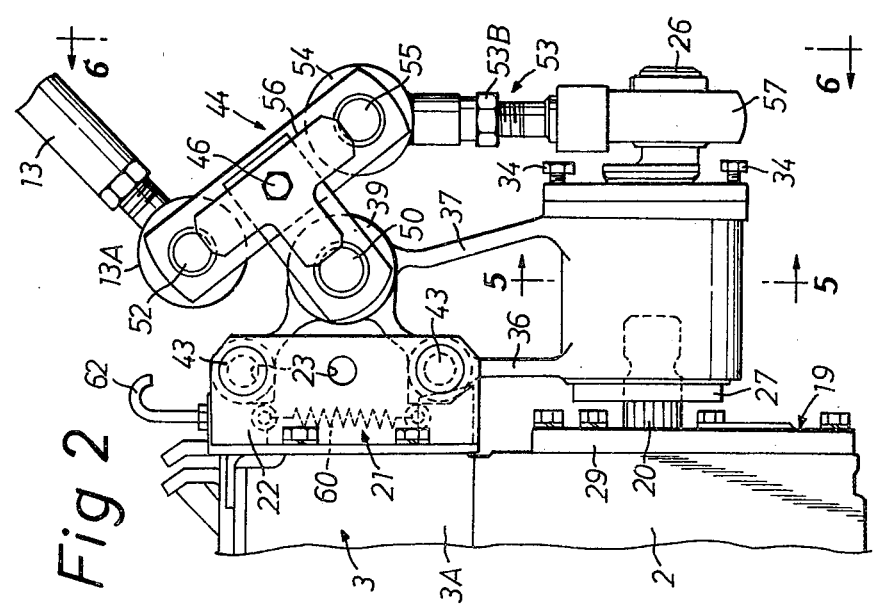

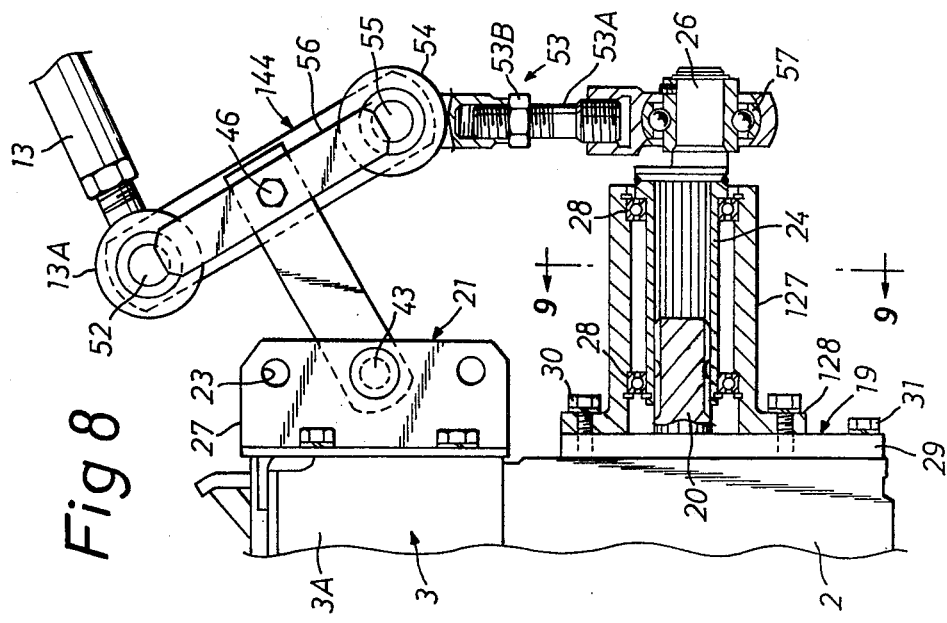
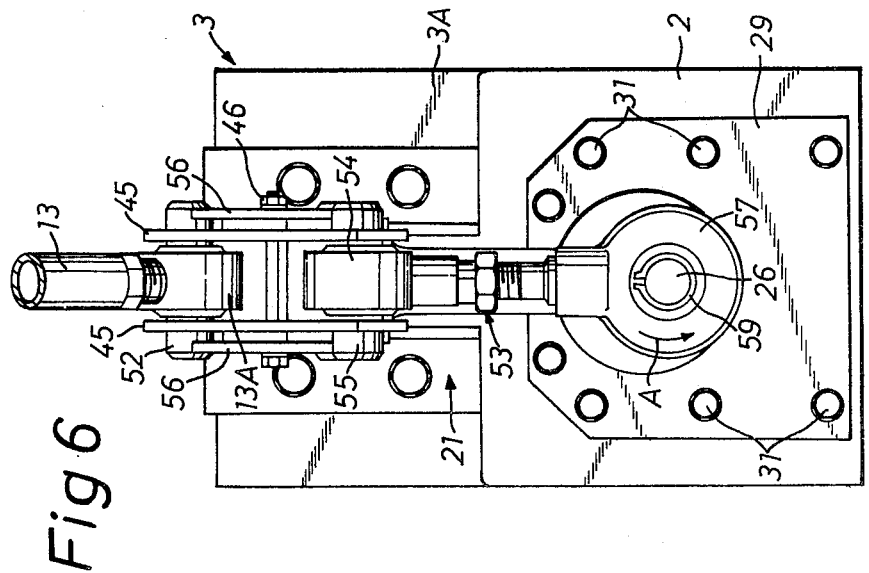

APPARATUS FOR TAKING OFF VIBRATORY POWER FOR TRACTOR

BACKGROUND OF THE INVENTION

The present invention relates to an apparatus for taking off a vibratory power for use in tractors, and more particularly to an apparatus for converting the torque of the PTO shaft of a tractor to a reciprocal linear motion via a crank motion to impart vibration to a soil improving working implement, such as a subsoiler or pan-breaker, which is attached to the tractor as by a three-point link assembly.

A subsoiler, pan-breaker or like soil improving working implement is vertically movably connected to a tractor as by a three-point link assembly to improve the surface soil or subsoil which has been degraded through years of use and to thereby promote the growth of the roots of crops or render the soil permeable to air and water.

For the soil improving work, a point attached to the lower end of a standard is placed directly into the subsoil to raise, crack, break or loosen the subsoil with the point. The standard is placed into or withdrawn from the soil while driving the tractor.

Since the standard is placed into the soil to the depth of the subsoil, the tractor encounters great resistance to traction, and this resistance invariably increases with the depth of tillage. When the implement is driven at a speed of 0.7 to 0.8 m/sec, the work efficiency achieved on the field is usually about 30 to 50 acres/hour.

While catapillar-type tractors are used for the work because of the great resistance involved, wheel-type tractors are also used frequently on soft paddy fields, usually with the rear wheels equipped with weights, wheel girdles, strakes or like auxiliary means for affording increased traction.

The work can be performed at a higher speed with improved efficiency if the resistance to traction can be reduced. For this purpose, a working implement of the by-blow type has been developed in which vibration is given to the standard.

Since the tractor is designed to perform a wide variety of agricultural works by traction, rotation and hydraulic or pneumatic power, the power source of the tractor is useful for producing the vibration necessary for the by-blow type working implement. However, because the power source is used for various agricultural working implements, the apparatus for taking off the vibratory power from the tractor for the by-blow type working implement must be easily mountable on and detachable from the tractor while assuring proper and smooth take-off and transmission of the vibratory power.

SUMMARY OF THE INVENTION

An object of the present invention is to provide a vibratory power take-off which utilizes the torque of the PTO shaft of a tractor for producing vibration for a by-blow type soil improving working implement.

Another object of the invention is to provide a vibratory power take-off which comprises a tubular transmitting shaft adapted to be detachably splined to the PTO shaft of a tractor and having a connecting portion eccentric with the axis of the PTO shaft, and intermediate vibration transmitting means supportable by the frame of the tractor pivotally movably up and down and coupled to the eccentric connecting portion so as to be pivotally movable up and down in accordance with the eccentricity of the eccentric connecting portion, the intermediate vibration transmitting means being operatively connectable to a working implement to give vibration to the working implement in its entirety.

Another object of the invention is to provide a vibratory power take-off which comprises a case fitting around the tubular transmitting shaft to support the tubular shaft rotatably relative thereto and detachably mountable on the tractor frame to assure safety and proper rotation of the tubular shaft free of deflection and to render the tubular shaft free from extraneous matter.

Still another object of the invention is to provide a vibratory power take-off in which the tubular transmitting shaft, the case, the intermediate vibration transmitting shaft, etc. are assembled into a unit while the tubular shaft is rendered easily fittable to and detachable from the PTO shaft, with the case also made detachably mountable on the tractor frame with ease, the case having an outer peripheral surface eccentric with the tubular shaft so that some deflection of the case can be absorbed or compensated for when the case is connected to the tractor frame with withdrawable pins.

Other objects, features and advantages of the invention will become apparent from the following detailed description of embodiments.

BRIEF DESCRIPTION OF THE DRAWINGS

FIG. 1 is a side elevation schematically showing a chisel-type subsoiler during operation as it is connected to a wheel-type tractor by a three-point link assembly;

FIG. 2 is a side elevation showing a vibratory power taking off apparatus of the invention in its entirety as it is attached to the tractor;

FIG. 3 is a side elevation showing the apparatus in its entirety before it is attached to the tractor;

FIG. 5 is an enlarged view in section taken along the line 5—5 in FIG. 2;

FIG. 6 is a view of the apparatus as it is seen in the direction of the arrows 6—6 in FIG. 2;

FIG. 7 is a plan view of FIG. 2;

FIG. 8 is a side elevation partly in section and showing another embodiment of the invention as it is attached to a tractor; and FIG. 9 is a view in section taken along the line 9—9 in FIG. 8.

DETAILED DESCRIPTION OF THE INVENTION

Figure 4:
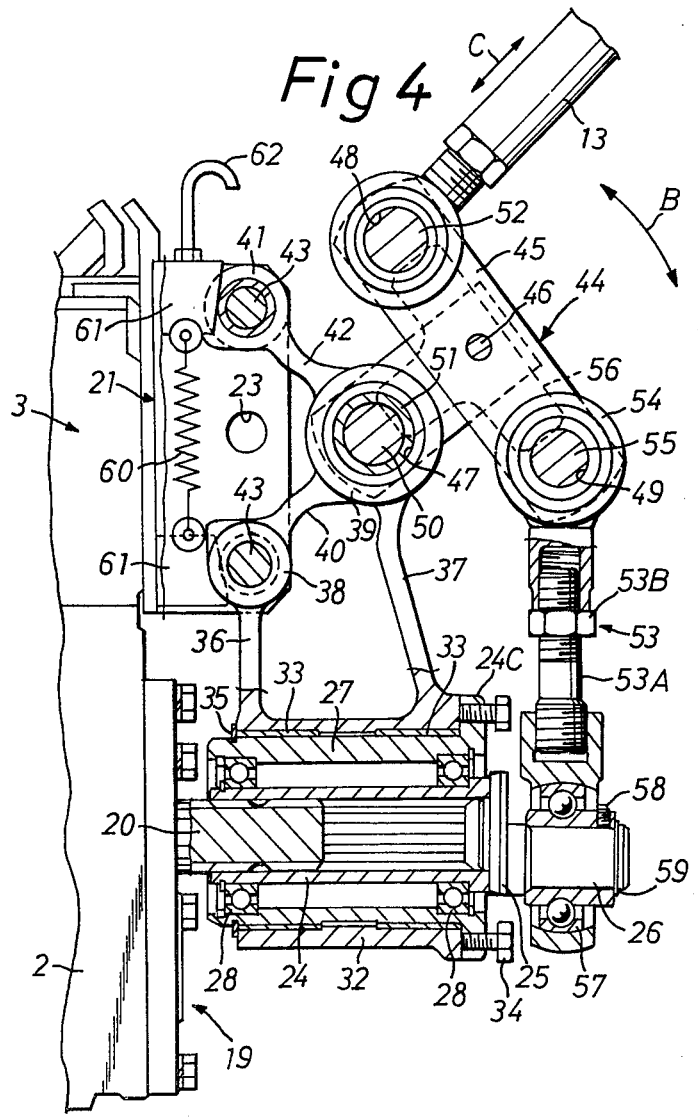
FIG. 4 is an enlarged view of FIG. 2 partly in section.

With reference to the drawings, and more particularly to FIG. 1, a wheel-type tractor 1 has a frame 2 comprising a transmission case, and a hydraulic unit 3 disposed on a rear top portion of the frame 2 for raising or lowering a working implement. The hydraulic unit 3 is provided with a pair of opposed lift arms 4.

A chisel-type subsoiler 5, illustrated as an example of soil improving working implement, chiefly comprises a frame 6, a holder 7 mounted on the frame 6 and holding a standard 8 fixedly or vertically slidably and a chisel point 9 detachably attached to the lower end of the standard 8. In the illustrated example, the subsoiler 5 has a mole ball 11 connected to the point 9 with a chain 10 and a disk colter 12 on the frame 6.

The standard 8, which is a straight plate-like bar having a front blade portion 8A, may have a rearwardly curved intermediate portion. The point 9 may be of the general-purpose type or may be provided with a wing for breaking up the soil effectively.

The working implement 5 is detachably attached to the tractor frame 2 by a three-point link assembly 15 comprising a central top link 13 and a pair of opposite lower links 14. The lift arms 4 are connected to the lower links 14 by lift rods 16 to raise or lower the working implement 5.

The working implement 5 may have a plurality of standards 8 as attached to a toolbar or the like fixedly or slidably transversely of the tractor for forming a plurality of furrows, or may be provided with the single standard 8 as illustrated for a single furrow.

To connect the working implement 5 to the tractor frame 2 with the three-point link assembly 15, a vibration producing assembly 17 is attached to the frame 2 for giving to-and-fro vibration at least to the standard 8 of the implement 5. In the illustrated embodiment, the top link 13 of the three-point link assembly 15 is connected to the vibration producing assembly 17 to give a to-and-fro pivotal movement to the whole implement 5 about a connection 18 between the lower links 14 and the implement 5, thus imparting vibration to the standard 8 and the point 9.

FIGS. 2 to 7 show a preferred vibratory power taking off apparatus of this invention comprising the vibration producing assembly 17 mounted on the tractor frame 2.

At a rear lower portion of the tractor frame 2 centrally of the width thereof, an outwardly projecting PTO shaft 20 is supported by bearing means 19. The PTO shaft 20, which is preferably of involute spline structure, is driven by the power of the tractor engine and has a peripheral groove 20A at an axially intermediate portion thereof.

Immediately above the PTO shaft 20, a channel-shaped connector 21 is attached to the rear wall of the frame 2 by welding or fastening members. In the embodiment illustrated in FIGS. 2 to 4, the connector 21 is attached to the rear wall of the housing 3A of the hydraulic unit 3. As schematically shown in FIG. 1, the connector 21 may of course be attached to the rear wall of the frame 2.

The connector 21 includes a pair of opposed side plates 22 each formed with a plurality of holes 23 arranged at predetermined spacing vertically in opposed relation to those of the other. Usually a ball joint 13A on the top link 13 is supported on a pin withdrawably inserted into a pair of holes 23.

A tubular transmitting shaft 24 has one end fittingly provided with a closure 25, which, in the illustrated embodiment, is welded to the shaft end. A projecting connecting portion 26 in the form of a rod and eccentric with respect to the axis of the transmitting shaft 24 is integral with the closure 25. The connecting portion 26 has a journal part.

The tubular transmitting shaft 24 which is detachably fitted around the PTO shaft 20 is splined in its inner periphery for engagement with the splined portion of the PTO shaft 20. The connecting portion 26 substantially integral with the transmitting shaft 24 is positioned to the rear of the PTO shaft 20 eccentrically therewith, such that at a position a large distance away from the tractor frame 2, the rotation of the PTO shaft 20 is convertable to a crank motion.

The tubular transmitting shaft 24 is housed in a holding case 27 with a pair of front and rear radial ball bearings 28 provided therebetween and is rotatable relative to the case 27. The holding case 27 is supported by the tractor frame 2 to prevent the deflection of the tubular transmitting shaft 24. The case 27 also serves to render the shaft 24 free from extraneous matter and assure safety for the operator.

FIGS. 8 and 9 show another embodiment including a holding case 127 formed with a flange 128 at its one end. The flange 128 is fitted and detachably fastened to the flange 29 of the bearing means 19 for the PTO shaft with bolts 30. Some of bolts 31 for the bearing means 19 are usable as the fastening bolts 30.

While the means for preventing the deflection of the transmitting shaft 24 and assuring safety can be in the form of the holding case 127 shown in FIGS. 8 and 9, the holding case 27 shown in FIGS. 2 to 6 is most preferable as will be apparent from the following description.

Further when the present apparatus is intended only to give to-and-fro vibration to the standard 8 and the point 9 shown in FIG. 1 without substantially contemplating the prevention of the deflection of the shaft 24 and assurance of safety, the holding case provided for the latter purpose can be dispensed with although not shown, and the present invention can be so embodied. In this case, the tubular transmitting shaft 24 can be prevented from slipping off the PTO shaft 20 by a retaining pin fitted in the peripheral groove 20A.

With the embodiment shown in FIGS. 2 to 6, the holding case 27 has an inner periphery 27A concentric with the PTO shaft 20 and the tubular transmitting shaft 24 at an axis O. The case 27 has an outer periphery 27B having an axis 01 which is deflected from the axis O by 3 mm. Thus the tubular case 27 has a varying wall thickness in cross section as seen in FIG. 5.

With reference to FIG. 5, a mounting cylinder 32 has an inner periphery 32A centered about the axis 01 and an outer periphery 32B in alignment with the axis O, the cylinder 32 thus varying in its wall thickness in cross section. The mounting cylinder 32 is fitted around the holding case 27 with a pair of front and rear bushes 33 provided between the inner periphery 32A of the former and the outer periphery 27B of the latter and is rotatable relative thereto. However, the cylinder 32 bears against a flange 24C on the case 24 and is held against rotation by a pair of threaded movable fastening members 34 attached to the flange 24C while being prevented from slipping off by a retaining ring 35.

As shown in FIGS. 2 to 4, the mounting cylinder 32 has a pair of front and rear connecting legs 36 and 37 integral therewith. The front leg 36 has at its upper end a support portion 38 formed with a lateral bore 38A. The rear leg 37 is provided at its upper end with a support portion 39 for intermediate vibration transmitting means 44, with a lateral bore 39A formed in the support portion 39.

The support portions 38 and 39 are interconnected by an arm 40. The support portion 39 is positioned at a substantially higher level than the support portion 38. A support portion 41 having a lateral bore 41A like the support portion 38 is connected to the support portion 39 by an arm 42. The support portions 38 and 41 are symmetrical with respect to the horizontal plane through the center of the support portion 39. The pair of support portions 38 and 41 are connectable to the connector 21 on the tractor frame 2 with headed pins 43. Stated more specifically, when the support portions 38 and 41 are placed between the side plates 22 of the connector 21 with their lateral bores 41A and 38A in alignment with the upper and lower pairs of holes 23 in the side plates 22 respectively, the support portions 38 and 41 can be detachably connected to the connector 21 with the withdrawable headed pins 43.

The intermediate vibration transmitting means 44 comprises a pair of opposed T-shaped side plates 45 connected together by a fastening member 46 and has pairs of opposed holes 47, 48 and 49 in a triangular arrangement. A headed pin 50 is passed through one pair of holes 47 and through the bore 39A in the support portion 39 of the rear leg 37, preferably with a bush 51 fitted in the holes and bore, to pivotably connect the means 44 to the support portion 39.

The ball joint 13A at one end of the top link 13 in the form of a turnbuckle is connected to the means 44 by a headed pin 52 inserted into another pair of holes 48. The top link 13 has at the other end a ball joint pivotably connected to an upper portion of the frame of the working implement 5.

Coupling means 53 has a ball joint 54 pivotably connected to the intermediate vibration transmitting means 44 by a headed pin 55 inserted into the remaining pair of holes 49. The side plates 45 of the means 44 are fastened together along with retaining members 56 by the above-mentioned member 46. The retaining members 56 hold the pins 50, 52 and 55 in position.

As best seen in FIG. 4, the coupling means 53 is provided at its one end with a radial ball bearing 57 of the self-aligning type. The inner race of the bearing 57 is fitted around the journal part of the eccentric connecting portion 26, fastened thereto with a set bolt 58 and held in place by a retaining ring 59. The coupling means 53 is made adjustable in its axial length by a threaded rod 53A and a locknut 53B.

According to the embodiment shown in FIGS. 2 to 7, the holding case 27 is fitted around the tubular transmitting shaft 24 with the bearings 28 provided therebetween and is rotatable relative thereto. The mounting cylinder 32 is fitted around the case 27 and held thereto by the fastening members 34. The intermediate vibration transmitting means 44 is pivotably connected by the pin 50 to the support portion 39 of the mounting cylinder 32 and is also pivotably connected by the pin 52 to the ball joint 13A of the top link 13. The means 44 is further connected to the eccentric connecting portion 26 of the tubular shaft 24 by the coupling means 53 with use of the ball joint 54, pin 55 and bearing 57. The vibration producing assembly 17 of the unit type thus constructed is attached to the tractor frame 2 as seen in FIG. 3. The connecting leg 37 serves as a handle for the user to grasp the assembly 17 along with the top link 13 for installation. The tubular transmitting shaft 24 is splined to the PTO shaft 20, and the pair of upper and lower support portions 41 and 38 are placed between the side plates 22 of the connector 21, while the fastening members 34 are loosened to render the holding case 27 and the mounting cylinder 32 rotatable relative to each other. Since the case 27 and the cylinder 32 are fitted together and slidable relative to each other over their opposed surfaces which are eccentric with respect to the axis of the PTO shaft, the bores 38A and 41A of the support portions 38 and 41 can be aligned with the corresponding holes 23 of the connector 21 with ease and accuracy. The pins 43 are inserted into the aligned portions to secure the mounting cylinder 32 to the tractor frame 2. The fastening members 34 are then tightened up to hold the cylinder 32 to the case 27 against rotation relative to each other. Consequently the fastening members 34, mounting cylinder 32, support portions 38 and 41, pins 43, etc. serve as means for securing the holding case 27 to the frame 2, thus permitting the holding case 27 to prevent the deflection of the transmitting shaft 24 and assure safety.

If the pins 43 in the pair of upper and lower support portions 41 and 38 backlash, wedges 61 interconnected by a spring 60 may preferably be placed between the support portions 38 and 41 and the connector 21 to eliminate the backlash. A hook 62, if attached to one of the wedges 61, is useful for removing the wedges. (See FIGS. 2, 4 and 7.)

With the vibration producing assembly 17 thus attached to the tractor frame 2, the lower links 14 and the top link 13 of the three-point link assembly 15, an example of connecting means, are connected to the frame 6 of the working implement 5 by ball joints and pins. When the tractor is driven with the PTO shaft 20 in rotation, the vibratory power take-off comprising the vibration producing assembly 17 brings the whole frame 6 into a reciprocal to-and-fro pivotal motion about the connection 18 in the embodiment, so that the standard 8 and the point 9 in to-and-fro vibration can be placed directly into the subsoil to a specified depth and driven at the depth for the desired work. Stated more specifically, in accordance with the eccentricity of the connecting portion 26 relative to the axis of the PTO shaft 20, the coupling means 53 is brought into a crank motion in the direction of arrow A in FIG. 6, and this motion pivotally moves the intermediate vibration transmitting means 44 up and down in the directions of arrows B in FIG. 4 about the pin 50. The pivotal motion in turn moves the top link 13, serving as vibration delivering means, reciprocally linearly in the directions of arrows C in FIG. 4. Consequently the motions in the directions of A, B, and C coact to pivotally move the whole frame 6 back and forth about the connection 18. The motion of the frame 6 gives to-and-fro vibration to the standard 8 and the point 9, causing the point 9 to break up the subsoil and the standard 8 to cut the upper soil layer with its blade portion 8A. The to-and-fro vibration of the standard 8 and the point 9 reduces the resistance to the traction of the tractor, permitting the working implement to break up the subsoil and cut the soil with greatly improved efficiency.

The embodiment shown in FIGS. 8 and 9 is basically identical with the embodiment of FIGS. 1 to 7 in respect of the vibration producing and transmitting means with the following exceptions. The vibration transmitting means of FIGS. 8 and 9 has an intermediate member 144 which is connected to the connector 21 with a pin 43. The holding case 127 for preventing the deflection of the transmitting shaft 24 and assuring safety comprises a circular wall of uniform thickness and is attached to the flange 29 of the bearing means 19 by fastening members 30 or 31 as already stated.

It will be readily understood that the vibration producing assembly 17 can be detached from the tractor frame 2 in the order reverse to the order described for attachment.

Although preferred embodiments of the invention have been described above in detail in respect of construction and operation, the invention further includes various modifications as will be exemplified below.

For example, the coupling means 53 for transmitting the vibration can be dispensed with when the intermediate vibration transmitting means 44, one of the transmitting means, is operatively coupled directly to the eccentric connecting portion 26 of the tubular transmitting shaft 24 by a universal joint.

As another modification, the standard 8 which is the working portion of the implement 5 or the holder 7 therefor may be attached to the frame 6 turnably on a lateral pin, and the vibration transmitting means which is reciprocally linearly movable may be coupled to the standard 8 or holder 7. In this case, the top link 13 may be attached to the connector 21 in the usual manner as an element of the three-point link assembly 15, or the working implement 5 need not always be connected by the three-point link assembly.

What is claimed is:

1. An apparatus for taking off a vibratory power for a tractor including a vibration producing assembly comprising a rotary transmitting shaft detachably fittable to a PTO shaft on the frame of the tractor and having a connecting portion eccentric with respect to the axis of the PTO shaft, a holding case housing the rotary transmitting shaft rotatably relative thereto having an outer peripheral portion, intermediate vibration transmitting means mountable on the tractor frame and pivotally movable up and down, and means for operatively coupling the connecting portion of the rotary transmitting shaft to the intermediate vibration transmitting means, the holding case being provided with a mounting cylinder fitting around the case and rotatable relative thereto, the mounting cylinder having support portions detachably connectable to the tractor frame, an inner peripheral portion and a portion for pivotably supporting the intermediate vibration transmitting means, the vibration producing assembly being in the form of a unit assembly from the rotary transmitting shaft, the holding case, the mounting cylinder, the intermediate vibration transmitting means and the coupling means.

2. An apparatus as defined in claim 1 wherein the outer peripheral portion of the holding case and the inner peripheral portion of the mounting cylinder are slidingly rotatable relative to each other and are eccentric with respect to the axis of the PTO shaft, and fastening means is provided for holding the peripheral portions to each other.

3. An apparatus as defined in claim 1 wherein the support portions of the mounting cylinder are fixedly connectable in a vertically shiftable position to a connector secured to the tractor frame.

4. An apparatus as defined in claim 1 wherein the support portions of the mounting cylinder are joined together by a handling grip for the unitary vibration producing assembly.

* * * * *